Aug. 6, 1929.　　　F. A. ZIBELMAN　　　1,723,320
TIRE LIFTING, CARRYING, AND LOWERING DEVICE
Filed March 21, 1925
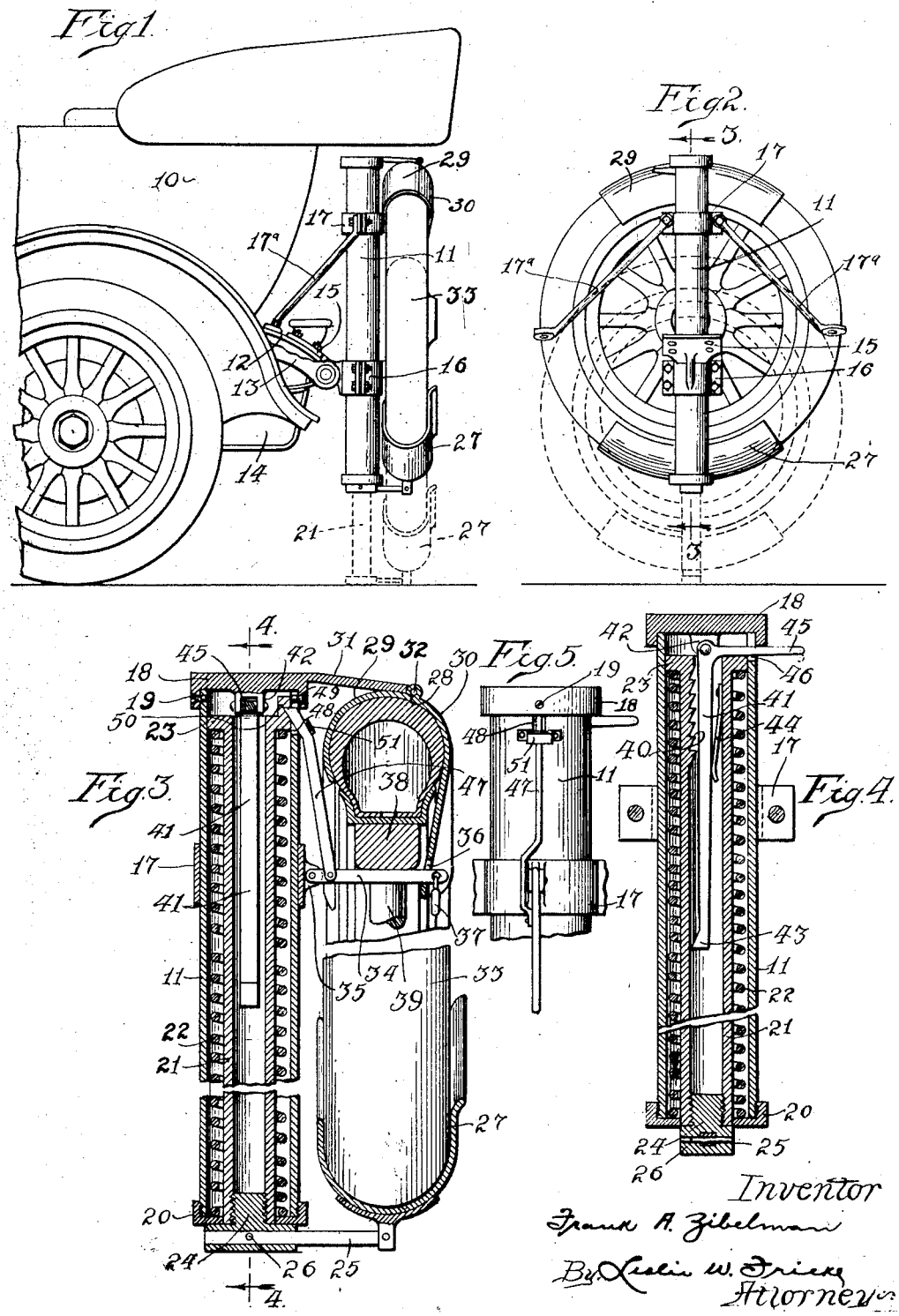

Patented Aug. 6, 1929.

1,723,320

UNITED STATES PATENT OFFICE.

FRANK A. ZIBELMAN, OF CHICAGO, ILLINOIS.

TIRE LIFTING, CARRYING, AND LOWERING DEVICE.

Application filed March 21, 1925. Serial No. 17,205.

My invention has reference more particularly to a tire carrier, wherein a lifting medium is provided to facilitate elevating the tire to the position in which it is carried on the car.

Extra tires are usually mounted on a rim or spare wheel and carried in an elevated position on the car. The combined tire and rim or spare wheel is quite heavy and hard to handle and it is not only difficult to lift same to the elevated position on the car, but inasmuch as the tire is usually dirty the clothes are oftentimes soiled.

The principal objects of my invention are to provide an improved tire carrier; to facilitate the lifting of the tire and rim or spare wheel to the elevated position in which it is carried on the car; to counteract the weight of the tire and rim or spare wheel so that it may be easily raised and lowered; to afford a lifting tension which is sufficient to lift automatically the tire and rim or spare wheel to the elevated position; to lock the lifting mechanism in the elevated position; to utilize a part of the tire carrier as a support in the raising and lowering operation; and in general, to afford a simple, compact and convenient tire holder and lifter.

The invention consists in the novel arrangements, constructions and devices to be hereinafter described and claimed for carrying out the above stated objects and such other objects as will appear from the following description of a certain preferred embodiment illustrated in the accompanying drawings, wherein—

Fig. 1 is a side view of the rear end of an automobile with my tire carrier and lifter thereon;

Fig. 2 is a front view of the carrier and lifter, apart from the car;

Fig. 3 is an enlarged sectional view, partly broken away, taken on the line 3—3 of Fig. 2;

Fig. 4 is a sectional view taken on the line 4—4 of Fig. 3; and

Fig. 5 is a detail view of a lock for holding the lifter in the elevated position.

Like characters of reference designate like parts in the several views.

Referring to the drawings, the reference numeral 10 indicates an automobile, at the rear end of which is mounted an upright tube 11 which serves as the casing for the lifting mechanism. This tube may be secured to the car in any convenient manner which will depend somewhat on the rear end construction of the particular car. In the present case a plate 12 is shown, which extends between and cross braces the frame sills 13 and covers the gas tank 14, and I have provided a main bracket 15 which is bolted or otherwise attached to the plate 12 and formed at the outer end with a split clamp 16 whereby the upright tube 11 is secured thereto. Another clamp 17 is secured to the tube 11 near the upper end and has a pair of divergent braces 17$^a$ extending forwardly therefrom and bolted or otherwise secured at their forward ends to the plate 12 or other part of the car.

The upper end of the tube 11 is closed by a cap 18, which may be attached to the tube in any suitable manner as by screws 19 arranged at intervals therearound and threaded into the wall of the tube 11. A cap 20 is also attached to the lower end of the tube 11 in any suitable maner as by a threaded connection, as shown, the cap being provided with a large central aperture which is slidably engaged by the tube 21. This tube 21 is sufficiently smaller than the tube 11 to afford an annular chamber therebetween for the compression spring 22 which is seated at the lower end against the cap 20 and at the upper end against an annular flange 23 provided on the upper end of the tube 21.

A head 24 is secured to the lower end of the tube 21 in any desired manner as by the threaded connection shown, and said head has an opening therethrough, preferably square, to receive the square stem 25 which is suitably locked therein as by the pin 26. This stem has an arcuate trough shaped shoe 27 pivoted on the outer end, which conforms to a portion of the periphery of the tire which is to be carried thereby and serves as the lower holder therefor.

An upper holder of similar shape but inversely positioned is located directly above the lower holder 27 and split longitudinally as at 28 into front and rear sections 29 and 30 respectively, the former of which is rigidly secured to an arm or bracket extension 31 of the cap 18, and the latter of which is hinged as at 32 to the section 29 or the outer end of the arm 31 so that it can be swung upwardly from the normal position shown in Fig. 3.

When the tire, which is indicated at 33, is in place, the lower portion rests in the holder 27 and the upper portion in the holder 29—30, and is locked in place by the section 30, the latter being held against swinging movement by a link or bar 34 which is pivoted at its inner or forward end between pivot lugs 35 on the clamp 17 so as to swing readily through the opening between two spokes into position to have its outer end inserted through an aperture 36 in the section 30 and locked in any convenient manner as by the padlock 37 which is passed through an aperture in the projecting end of the link 34. In such position, the bar 34 is adapted to support the tire assembly independently of the spring.

This carrier is designed for use with any form of tire assembly, either for a single tire or a plurality of tires and either of the ordinary rim or spare wheel of disk, wire or artillery type, a single tire carrier of the latter type being shown herein, and the link 34 is arranged to swing under the upper portion of the rim or wheel and to extend substantially from side to side of the rim or wheel, in the present case under the felly 38 and between the spokes 39.

When the tire is to be placed in the carrier or removed therefrom, the holder 27 is depressed and the tube 21 slides downwardly in the tube 11, against the tension of the spring 22, until the head 24 rests on the ground, in which position the tire can be removed from or placed in the holder 27 by rolling it into the end of the holder or by an easy lift over the side of the holder. Preferably the tubes 11 and 21 are cylindrical and the aperture in the member 20 is circular whereby the tube 21 may be turned on its axis and thus permit the tire to be rolled out of the holder 27 without interference from fender, bumpers, or any other projecting parts that may be present on the car. The spring 22 may be of any desired tension, that is, to counteract more or less of the weight of the tire and rim or spare wheel and permit same to be easily lifted to the carrying position, but I prefer to use a spring which has sufficient tension to lift automatically the tire and rim or spare wheel to the carrying position without any effort of the person whatever, except to steady the tire and direct it into the opened up holder 29—30.

Obviously, with a spring of such tension it is desirable to hold the parts in the lowered position against the lifting tendency of the spring, and for this purpose the tube 21 is internally formed at the upper end with a series of rack teeth 40 and a long pawl 41 is pivoted at its upper end between pivot lugs 42 on the cap 18 and has a pointed toe at its lower end for engagement with the rack teeth 40 when the tube 21 is depressed. A leaf spring 44, fixed to the wall of the tube 21 bears against the back of the pawl to force the pointed toe 43 into engagement with the teeth 40, and an integral arm 45 extends laterally from the upper end of the pawl 41 through a vertical slot 46 in the wall of the tube 11 so that the operator may conveniently release the pawl 41.

The spring 21 preferably has just sufficient tension to positively lift the tire to the carrying position in order that the tire may be easily pressed down to the ground, and it is desirable, in order to prevent chattering when the car is running, to lock the tube 21 securely in the uppermost position. To this end I have provided an automatic lock, controlled by the link 34. Said lock comprises a bar 47 which is pivoted at its lower end to the link 34 and is formed with a bend at the upper end adapted to project through a slot 48 in the wall of the tube 11, said bar 47 having a pointed end which engages a recess or seat 49 in a lug or extension 50 on the upper end of the tube 21. A strap 51 on the tube 21 holds the upper end of the bar 47 against displacement and the angularity of the upper end of the bar 47 is such that when the link 34 is swung downwardly the upper end of the bar is fully withdrawn from the seat 49 and when the link 34 is raised to the locking position the strap 51 directs the upper pointed end of the bar 47 into engagement with the seat 49. With this arrangement the locking of the tube 21 in the elevated position is not only positively insured when the link 34 is swung up to lock the tire in the carrier, but there is sufficient lifting leverage on the bar 47 to insure a clamping of the tube 21 in the elevated position and hence a rigidity that will prevent chattering.

I do not intend to limit my invention to the details of construction shown and described, except only in so far as certain of the appended claims are specifically so limited, as it will be obvious that modifications may be made without departing from the principles of my invention.

I claim:

1. A tire lifting and carrying device for an automobile, comprising in combination a shoe, means for supporting said shoe in elevated position on the frame of an automobile and for lowering it alternatively to the ground for rolling a tire into position thereon, and yielding means serving to assist in raising said shoe and tire into said elevated position.

2. A tire lifting and carrying device for an automobile, comprising in combination a guide to be secured in vertical position on the frame of an automobile in elevated position thereon, a slide-bar movable along said guide, spring means serving to hold said slide-bar yieldingly in raised position with respect to said guide, a shoe carried by the lower end portion of the slide-bar and movable thereby to the ground for receiving a tire rolled into position thereon, and latch means for holding said shoe releasably in its lowered position.

3. In a device of the class described, the combination of a pair of vertically spaced holders adapted to engage, respectively, upper and lower portions of a tire, said lower holder being mounted for elevational adjustment, resilient means for lifting the lower holder and tire thereon so as to clamp the tire between the holders, and means for locking the lower holder in raised and lowered positions.

4. In a device of the class described, the combination of a tire holder having a pair of vertically spaced reversely recessed seats wherein the lower seat is mounted for elevational adjustment and the upper seat is formed of a stationary and a hinged section, resilient means for elevating the lower seat, and a connection insertible under the upper portion of the tire for locking the tire in the upper seat and holding the hinged section of said seat against the tire.

5. In a device of the class described, the combination of a tire holder having a pair of vertically spaced seats for engaging, respectively, upper and lower portions of a tire, the lower seat being mounted for elevational adjustment to clamp the tire between the seats, a link adapted to be inserted under the upper portion of the tire to lock same in the upper seat, and a member operated by said link for holding the lower seat in the elevated position.

FRANK A. ZIBELMAN.